(12) United States Patent
Healy

(10) Patent No.: US 10,044,781 B2
(45) Date of Patent: Aug. 7, 2018

(54) SYSTEMS AND METHODS TO ORGANIZE, AGGREGATE, FILTER, SORT, SHARE, AND DISCOVER, DIGITAL CONTENT

(71) Applicant: Tipping Point, LLC, Burlingame, CA (US)

(72) Inventor: Brendan Healy, Burlingame, CA (US)

(73) Assignee: Tipping Point, LLC, Burlingame, CA (US)

( * ) Notice: Subject to any disclaimer, the term of this patent is extended or adjusted under 35 U.S.C. 154(b) by 143 days.

(21) Appl. No.: 15/180,078

(22) Filed: Jun. 12, 2016

(65) Prior Publication Data

US 2016/0366200 A1 Dec. 15, 2016

Related U.S. Application Data

(60) Provisional application No. 62/175,074, filed on Jun. 12, 2015.

(51) Int. Cl.
*H04L 29/08* (2006.01)
*H04L 29/06* (2006.01)
*H04N 21/20* (2011.01)

(52) U.S. Cl.
CPC .............. *H04L 65/60* (2013.01); *H04L 67/02* (2013.01); *H04L 67/10* (2013.01); *H04L 67/18* (2013.01); *H04N 21/20* (2013.01)

(58) Field of Classification Search
CPC ..... H04L 65/60; H04L 65/4084; H04L 67/10; H04L 67/02; H04L 67/18; H04N 21/20; G06F 17/30011; G06F 17/30017; G06F 17/30174; G06F 17/30752; G06Q 10/00; G06Q 30/0277; G09C 5/00; G11B 27/031; H04H 20/62

See application file for complete search history.

(56) References Cited

U.S. PATENT DOCUMENTS

| | | | |
|---|---|---|---|
| 2004/0101156 A1* | 5/2004 | Kacker | G11B 27/031 382/100 |
| 2006/0159109 A1* | 7/2006 | Lamkin | G06F 17/30174 370/401 |
| 2009/0198732 A1* | 8/2009 | Ross | G06F 17/30011 |
| 2012/0087634 A1* | 4/2012 | Lalwaney | H04L 65/4084 386/241 |
| 2012/0124368 A1* | 5/2012 | Driessen | G09C 5/00 713/153 |
| 2014/0059184 A1* | 2/2014 | Bird | H04H 20/62 709/219 |
| 2014/0074938 A1* | 3/2014 | Deane | G06Q 10/00 709/204 |

(Continued)

*Primary Examiner* — Le H Luu
(74) *Attorney, Agent, or Firm* — Condo Roccia Koptiw, LLP

(57) ABSTRACT

Methods and systems to enable system users to share, discover, stream, purchase, and otherwise support content generated by other users. An interest indication system referred to as GreenLighting may be used to tag content and/or other users of interest. The GreenLight system may then be used to search, filter, sort, and stream content based on preferences and relationships between users. The systems and methods described herein may be embodied as a website that is accessible to both content creators and end users attempting to discover and view content.

16 Claims, 8 Drawing Sheets

(56) References Cited

U.S. PATENT DOCUMENTS

| | | | |
|---|---|---|---|
| 2015/0120767 A1* | 4/2015 | Skeen | G06F 17/30752 707/754 |
| 2015/0142615 A1* | 5/2015 | Klein, Jr. | G06F 17/30017 705/26.82 |
| 2016/0149982 A1* | 5/2016 | Darby | G06Q 30/0277 715/720 |

* cited by examiner

SYSTEMS AND METHODS TO ORGANIZE, AGGREGATE, FILTER, SORT, SHARE, AND DISCOVER, DIGITAL CONTENT

CROSS-REFERENCE TO RELATED APPLICATIONS

This application claims the benefit of U.S. Provisional Application No. 62/175,074, filed Jun. 12, 2015, which is incorporated by reference herein.

BACKGROUND

Historically, major record labels stood between artists and potential fans due in large part to the labels' ability to control and enhance artists' access and visibility to the public and also due to the labels' unique ability to increase exposure and availability of artists' music for listening, purchase and licensing opportunities. For example, at the turn of the century, major record labels still wielded near-exclusive control over the most trusted, known and used sales and distribution channels. One must remember that all these channels were extremely inaccessible from the average musician/artist's perspective in order to understand why bands were hoping nonetheless to sign with one of 'Big Six' (at the time) despite the fact that the few of the bands and artists who actually did sign, actually signed extremely unfavorable, one-sided contracts. The major labels' ability to provide massive scale and exposure for the respective artists who they signed was further bolstered by what amounted to a near-exclusive power to promote artists' music on the radio and through other media, ensure radio play, boost album and ticket sales, and to generally increase overall awareness for their respective artists' music. The major labels stranglehold over the entire process was so severe that they were able to sign artists to extremely one-sided contracts with relative ease. Many artists composed songs on the subject, specifically addressing "selling out" and related themes and topics, even after they signed with major record labels ultimately demonstrating how limited their options truly were when it came to somehow generating massive exposure for their music and/or band.

Traditionally, Independent Artists, Filmmakers, Producers and various types of other Artists and Content-Creators (for example: fashion designers, animators, photographers, authors, surfers, etc.) have faced a disconnect when attempting to share, promote, sell, or otherwise make their work, art, craft, skill, work, hobby, etc. known to the most relevant fans who may not even be aware that such an art, skill, genre, etc. exists. For example, even with the major streaming platforms currently allowing artists and content-creators to stream their respective content, the artists and content-creators also face the unique and distinct challenge of introducing potential fans to their music, and to inform fans (and potential fans) that their content is available to stream and/or otherwise accessible/available for download/for sale/ etc. on whatever streaming platform(s), digital storefront, etc. that hosts their songs, videos, photos, etc. and processes related transactions, etc.

Major record labels have long been considered a powerful, yet self-serving 'one-stop shop' for artists determined to increase awareness and/or recognition for their music, and/ or increase revenue generated by their music (e.g. downloads, streams, tickets, related merchandise, etc.) due to the major labels' ability to finance, produce, promote their music, and increase distribution, sales and overall awareness and/or demand for their artists' music and work. The vast majority of independent artists' music, however, did not (and still does not) fit into the long-since-merged, but still very involved, remaining 'Big 3' major labels' rigid, profit-driven paradigm of marketable music applied to attract maximum potential consumers and, ultimately, to increase revenue as opposed to any genuine art-driven interests or motive in many cases. The ultimate effect is a general public extremely unaware of a gigantic variety of unique, original, often times very high-quality productions (simply based on huge advances in recording technology, etc.) although, perhaps, niche music and video genres, artforms, fashion, etc. that people are creating in and making their work and other creations, etc. available for others to enjoy, access, support, etc.

On account of the recently begun digital and mobile commerce revolutions which continue with advances into unchartered territory just about daily at this present time, Independent Artists, Filmmakers, Authors, Content-Creators (comprised by an enormous variety of generations, backgrounds, eras, styles, etc.), Producers, Publishers, etc. have a tremendous abundance of options at their disposal for creating, financing, producing, promoting, sharing, distributing and monetizing their work, etc. Technology's role in facilitating the ability for just about any one of the presently estimated 3+ billion people on the web to execute each and every one of these endeavors cannot be overstated. Most of those fields, industries, endeavors, etc. happen to be the exact same benefits, perks, assistance, etc. that used to be (and, for many in the general public including artists, still are) associated with signing a contract with a major record label (i.e., means to increase visibility, exposure, demand, etc. for artists and their work, means to monetize artists' work through what approximately two-to-three decades ago amounted to effectively impossible-to-access distribution channels, networks {media and otherwise}, etc.) but, in the last decade, have become far more accessible and ubiquitous, which has created a never-before-enjoyed ease/accessibility of creating, producing, recording, editing, mixing, mastering, posting, sharing, and delivering content directly to fans and/or consumers (and/or potential fans, etc.) through products and platforms, nearly none of which even came into existence until a little more than a decade into this 21st century.

The digital and mobile commerce revolutions have enabled artists, bands, singers, musicians, content-creators, etc. to avoid one-sided contracts with major record labels, whose reign as the only provider of large-scale access to consumers has finally come to an end. The general public appears mostly unaware and/or unaffected by the drastic changes within the recording industry, despite the fact that these massive changes only began at the turn of the century and remain ongoing. Furthermore, despite the very recent, very significant underlying shift in the recording industry's landscape, the remaining 'Big Three' are still extremely involved in both the music and tech landscapes, primarily perhaps because the two of them have grown to be so intertwined themselves. For example, nearly every major web-based, digital download and streaming platform, etc. (e.g. iTunes, Pandora, etc.) has brokered deals with the 'Big Three'—collectively or independently—for the legal right, among others, to offer each labels' respective catalogue of songs to their customers for download, stream, etc.

Presently, independent artists, content-creators, etc. have an abundance of tools and technology at their disposal, but the primary goal of nearly all of the companies providing said tools and technology at the present time is to establish and/or maintain the viability and profitability of their respective business(es) as opposed to building anything that actually functions as a genuine, effective resource for independent artists and other content-creators, who lack the financing and marketing power of one of the major record labels. The remaining major labels, while reduced in number from "the Big Six" a little less than two decades ago to just the 'Big Three' today have been successful at establishing a strong foothold in the majority of newer, primarily web-based revenue streams available to artists at this time. Providing access to the catalogues of the 'Big 3' was, and continues to be, a significant expense for all web-based download and streaming hubs, providers, etc. that negotiated for the right to offer songs, the rights to which are owned and controlled by each of the major record labels comprising the 'Big 3'. That is one reason, perhaps, why none of the web-based streaming/download providers appears to recognize or to be working towards featuring, promoting or otherwise providing the general public with access to the plethora of artists, bands, etc. who are creating outside of the sales-driven/marketability paradigm that seems to influence which artists the 'Big 3' offers contracts to—often at the expense of the more original artists creating and trying to share more unique songs, sounds, messages, videos, creative endeavors, etc.

SUMMARY

Disclosed herein are methods and systems devised and built to enable users (e.g. independent artists, musicians, filmmakers, fashion designers, animators, photographers, authors, and any other content-creators, copyrightholders, etc.) to share and/or to monetize their work by making it available (e.g. to stream, to download, etc.) and more visible to relevant audiences and fans of their work and/or genre (and/or potential fans of their work and/or genre) through a unique framework involving aggregation, filtering, sorting, etc. These methods and systems enable artists, content-creators, etc. to increase visibility for—and access to—their work with relevant fans and interested (or potentially interested) audiences by hosting and organizing their content, collectively, based on specific criteria (e.g. time, genre, location, interactions and activity of system users, etc.) into digital "Arenas" that fans and all those with system access are able to use in order to locate, discover, stream, purchase and otherwise interact with, access and demonstrate their support and/or appreciation for content and content-creators who appeal to their artistic tastes and interests, etc. The systems and methods described herein may be embodied as a website that is accessible to both content-creators and end users (e.g. fans, enthusiasts, other artists, etc.) attempting to discover, access, stream, download and otherwise interact with and/or demonstrate support for those creators and their content. The system and the computer architectural framework supporting the website (e.g., servers that maintain/store content, perform the underlying aggregation functionality, manage and execute filtering functionality, privacy settings, etc.) may be referred to, collectively, as the "7G system" or "7G" and the users/content creators may be referred to collectively and/or individually as "7G members," "7G users," or "members" or "users."

As an example, a method may be utilized to enable artists "to dock" their music (and other media, digital content, digital representations of real content, artwork, etc.) to their respective 7G user profiles (e.g., hosted by 7G servers, 7G's cloud environment, et cetera) and "to post" said content to "7G Arenas" (e.g. a system comprised of methods of aggregation, filtering, sorting, etc.) through the use of automated moderation process, for example, that administers "7G Keys" (e.g. key icons) that enable system users to post their digital content to various 7G Arenas. 7G's automated moderation process may determine whether posted content is in accordance with 7G's Terms of Use (e.g. Posted by Copyright owner, doesn't violate DMCA, etc.), for example, confirm relevancy and other qualifying criterion, etc.

7G has developed a "GreenLight Framework" whereby 7G users, content, "Arenas," "Notes," "Blasts," "Arena Proposals," etc. may be "GreenLit." 7G users may "GreenLight" anything that appeals to them or they want to access, separately, from their personal "7G Stream." The 7G "GreenLight Framework" may be used a tallying system, ranking/featuring system, etc. 7G users, content, "Arenas," "Blasts," "Notes," "Arena Proposals," "Forums," "Threads," etc. may be filtered and/or sorted according to each respective 7G user's GreenLight activity with content and content-creators as well.

The GreenLight Framework also enables 7G users to filter, sort and otherwise display and access various 7G users and content in a variety of specified contexts, timeframes, etc. including 7G Arenas, 7G Forums, "7G LeaderBoards," "7G #Search," etc. The GreenLight Framework features methods by which 7G users are enabled to control privacy settings for their respective 7G profiles. 7G users may control what information of theirs (e.g., in the upper dash, media dock, and multiple sub-tabs of their profile pages, for example) is visible and/or otherwise view-able, etc. to other 7G users based on the following four "GreenLight Populations" (e.g. possibilities with respect to the different GreenLight scenarios among every 7G user): "Pop A" Users have exchanged GreenLights with each other; "Pop B"—A user has GreenLit the other user but has not been GreenLit by that other user; "Pop C"—A user has been GreenLit by another user but has not GreenLit that other user; "Pop D"—no GreenLights by either user.

A client-server computer architecture may be used to implement a system whereby users may access a web, mobile, Smart TV, Smart Watch, Smart Car, Smart Home application, etc. that facilitates sharing and discovering of content-creators and their content. The server may be configured to factor relationships between different users based on "GreenLight Populations" (aka "GreenLight Pops A, B, C, and D"), preferences of users within specific "GreenLight" or "Lucky 7" populations, for example, to feature, recommend, or otherwise display content to specific sets of users and/or throughout certain areas of the site, user profiles, etc.

The 7G system may include a "7G Arena Framework" which is comprised of systems for organizing, managing, and aggregating digital content. The 7G Arena Framework may facilitate the sharing, and discovering of music and other types of artwork and content, in general. The 7G Arena Framework may be maintained at the server. In some aspects, the 7G Arenas may be considered a type of "multiple-winner" event/concept that enables 7G users to post media, and allows other 7G users to "GreenLight" content, rate content, and interact with content and content-creators in a variety of ways such as posting "Notes" (e.g. digital photos, etc.) that content-creators may feature alongside their content, and are archived on a daily basis. 7G user activity in 7G Arenas may affect how the content and 7G users are featured and/or recommended to respective 7G users.

7G Arenas may be specific to a certain type of content (e.g., songs, videos, books, etc.) and/or a certain genre (e.g., rock, folk, jazz, blues, etc.). While a 7G Arena is live, 7G users may vote on and otherwise rate content within the arena. 7G Arenas may be location-specific (e.g., a first arena may be specific to the state of California or a city/neighborhood/district in California, a second arena may be specific to the City of Baltimore, a third arena may be specific to a certain venue in Los Angeles, etc.), content-based (e.g., a first arena for music, a second for film and video, a third fashion, etc.) and/or time-sensitive (e.g., users may only be able to post content to a certain Arena for one day, one week, one month, etc.). All Arenas are archived and accessible after Arena submissions may no longer be posted. The content, activity, and interactions within an arena may be used to promote certain content and/or users (e.g., content receiving more GreenLights may be presented to users visiting the 7G homepage) and/or to influence future presentations of content and/or users (e.g., a user who GreenLights or otherwise interacts with a certain musical act or their content in an Arena may be more likely to be presented with additional content, updates, etc. regarding that act). In addition to presenting content—the 7G system enables users to discover content themselves and control which artists and bands, for example, they are able to get updates on and/or track "Blasts" (i.e. text-based updates), etc.

Every 7G Arena may feature a corresponding "7G Forum" which provide 7G users with various methods of filtering and sorting "7G threads" (e.g. which 7G users have the ability to create and "GreenLight") and the comments 7G users have the ability "to post" to 7G threads. Additionally, the threads and forums may be filterable according to four clearly defined "GreenLight Populations" with respect to each user of the system.

As an example, a method for distributing content implemented by a system with one or more servers may include receiving a first request. The first request may correspond to a request to add first content to a media dock associated with a first user. The system may determine whether to allow the first content to be added to the media dock associated with the first user based on one or more characteristics of the first content. The system may associate the first media with the media dock associated with a first user on condition it was approved to be added to the media dock associated with the first user based on the one or more characteristics/criterion of the first content. The system may receive a second request. The second request may correspond to a request to add the first content from media dock associated with a first user to a first arena. The arena may correspond to an aggregation of content associated with a common time, common location, and common genre. The system may add the first content from the media dock associated with the first user to the first arena. The system may send a first webpage to at least one device associated with another user. The first webpage may comprise a visual representation of the first arena. Content, including the first content, that has been added to the arena may be displayed on the visual representation of the first arena. Content may be streamed and interacted with in a variety of methods by users accessing the content in the arena.

The system may receive a request to sort the content that has been added to the first arena from the other/a second user. The request to sort may indicate that the content is to be sorted based on a first criteria. The first criteria may correspond to filtering and/or sorting according to at least one plurality of user populations defined with respect to the second user (i.e. Pop A, Pop B, Pop C, etc.). For example, the plurality of user populations defined with respect to the second user may comprise four user populations defined with respect to the second user. The four user populations defined with respect to the second user may corresponding to 1) a first population (i.e. "Pop A" corresponding to users that have both indicated interest in/support for the second user (e.g., GreenLit the second user) and have had the second user indicate interest in/support for them (e.g., have been GreenLit by the second user); 2) a second population, (i.e. "Pop A") corresponding to users that have indicated interest in/support for the second user and but have not had the second user indicate interest in/support for them; 3) a third population, (i.e. "Pop C") corresponding to users that have not indicated interest in/support for the second user, but have had the second user indicate interest in them (e.g. second user GreenLit them); and 4) a fourth population (i.e. "Pop D") corresponding to users that have neither indicated interest in the second user nor have had the second user indicate interest in them. The request to filter and/or sort may also indicate a secondary criterion for filtering and/or sorting the content of the first arena that share a common first criterion.

The system may send, receive, view, and otherwise access text-based messages/updates (i.e. "Blasts") from a first user. The system may associate the initial "Blast" with the first content in the first arena based on receiving the blast message from the first user. The "Blast" message may be displayed on a profile page of the first user based on the first user transmitting the "Blast" to the system. The "Blast" may be automatically displayed along with the first content posted by the first user in the visual representation of the first arena based on the "Blast" being transmitted from the first user to the 7G system. The system may receive a second blast message from the first user. The system may associate the second "Blast" with the first content in the first arena based on receiving the second "Blast" from the first user. The system may replace the previously displayed "Blast" with the second "Blast" in the visual representation of the first "Arena" based on receiving on receiving the second "Blast" from the first user. The system may receive a request from another user to stream the first content included in the first arena. The system may send the first content to the another user, and the user may be able to view the current and older "Blasts" transmitted to the system by the first user/content-creator while that user is streaming digital content.

A method for associating images with content (i.e. "Notes") implemented by a system with one or more servers may include receiving a first request. The first request may correspond to a request to add first content to a media dock associated with a first user. The system may determine whether to allow the first content to be added to the media dock associated with the first user based on one or more characteristics of the first content. The system may associate the first media with the media dock associated with a first user on condition it was determined to all the first content to be added to the media dock associated with the first user based on the one or more characteristics of the first content. The system may receive a second request. The second request may correspond to a request to add the first content from media dock associated with a first user to a first arena. The arena may correspond to an aggregation of content that are associated with a common time, common location, and common genre. The system may add the first content from the media dock associated with the first user to the first arena. The system may receive a request from a second user to associate an image with the first content in the first arena. The system may determine whether the second user is permitted to associate the image with the first content or has been authorized by the first user (e.g. based on the first user's "GreenLight Pops" settings). The system may add the image to a grid associated with the first content (or the first user may approve/feature on an image-by-image basis, manually for all images posted, manually for all images posted by a specific GreenLight Pop, etc.) on condition that it is determined that the second user is permitted to associate the image with the first content or has been authorized by the first user (e.g. according to the first user's "GreenLight Pops" settings, etc.). The grid may comprise a plurality of image positions and the image is added to one of the plurality of grid positions. The system may send a first webpage to at least one device associated with another user. The page may comprise a visual representation of the first arena. Content, including the first content, that has been added to the arena may be displayed on the visual representation of the first arena, the image may be displayed in the grid, and the grid may be displayed with the first content (i.e. within the same media player, etc.)

The system may receive a request from the first user to move the image to a different position in the grid. The system may send an updated first webpage to at least one device associated with another user, the updated first webpage comprising the visual representation of the first arena, wherein the content, including the first content, that has been added to the arena is displayed on the visual representation of the first arena, the image is displayed in the updated position in the grid, and the grid is displayed with the first content. The plurality of image positions in the grid may correspond to nine image positions. The system determining whether the second user is permitted to associate the image with the first content may be based on which of a plurality of user populations the second user belongs to with respect to the first user. For example, the second user may be defined to be in a first population on condition that the first user has indicated an interest in the second user and the second user has indicated an interest in the first user. The second user may be defined to be in a second population on condition that the first user has not indicated an interest in the second user and the second user has indicated an interest in the first user. The second user may be defined to be in a third population on condition that the first user has indicated an interest in the second user and the second user has not indicated an interest in the first user. The second user may be defined to be in a fourth population on condition that the first user has not indicated an interest in the second user and the second user has not indicated an interest in the first user. The first content may be received from a third party platform separately from the request to add the content to the media dock received from the first user.

A method of aggregating content of interest to a user implement by system with one or more servers may include receiving a request for a content stream from a first user. The request for the content stream may indicate that the user is requesting content associated with one of a plurality of user populations. The plurality of user populations may include a first population corresponding to users that have both indicated interest in the first user and have had the first user indicate interest in them, a second population corresponding to users that have indicated interest in the first user and but have not had the first user indicate interest in them, a third population corresponding to users that have not indicated interest in the first user but have had the first user indicate interest in them, and a fourth population corresponding to users that have neither indicated interest in the first user nor have had the first user indicate interest in them. The system may send a webpage aggregating a plurality of content to the first user. The plurality of content may correspond to content generated by one of the first population, the second population, the third population, or the fourth population depending in which one of the plurality of user populations was indicated in the request for the content stream. The first request may further indicates that the first request is associated with a specific arena, the specific arena may have content associated with a common time, common location, and common genre, and the plurality of content aggregated in the webpage may correspond to content generated by one of the first population, the second population, the third population, or the fourth population that has been added to the specific arena.

DETAILED DESCRIPTION

A detailed description of the illustrative embodiments referenced above is provided in this section with reference to the various Figures (aka "FIGs"). Although the following description provides detailed examples of potential implementations and uses for various systems and processes for aggregating and distributing content, it should be noted that the details are intended to be exemplary and in no way do they limit the scope of the application.

Figure 1:
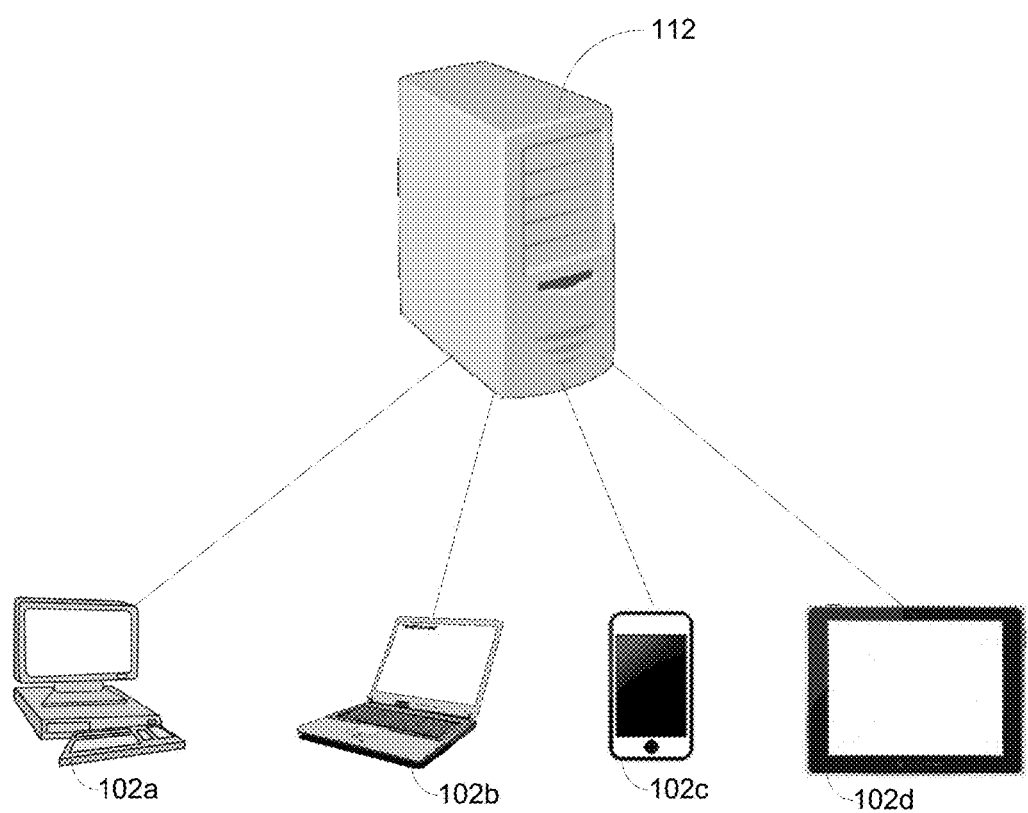
FIG. 1 provides an example of the client-server architecture that may be used to implement aspects a system for content hosting and distribution.

FIG. 1 provides an example of the client-server architecture that may be utilized to manage and implement aspects of the digital content hosting, aggregation, organization, and discovery systems. Users of said systems may access Server 112 using various Client Devices 102a, 102b, 102c, 102d, etc. Server 112 may utilize one or more processors configured to implement instructions for implementing various methods of hosting, sharing, and aggregating digital content as described herein. The instructions may be stored in the form of computer-readable instructions stored on memory of Server 112 (e.g., hard-drives, flash memory, solid-state memory, random access memory (RAM), read-only memory (ROM), other tangible, non-transitory memory, etc.), and a processor may execute the instructions stored therein. Similarly, Client Devices 102a, 102b, 102c, 102d, etc. may include one more processors and memory for executing various techniques described herein.

For example, Server 112 may act as a webserver for providing webpages requested by Client Devices 102a, 102b, 102c, 102d, etc. The content of the webpages (e.g., which artists and/or items of content are displayed when a web-page is requested by a client) may depend on the identity of the user accessing the Server 112 via Client Devices 102a, 102b, 102c, 102d, etc. When used herein, the term "user" (or "7G user") may refer to a user of the client's device who is accessing Server 112. "7G user" or "user" may refer to people who create a 7G account to discover, locate, and stream content or to post and otherwise share content they've created. When used herein, actions taken by users may correspond to steps implemented via one or more Client Devices 102a, 102b, 102c, 102d, etc. Example implementations of Client Devices 102a, 102b, 102c, 102d may include personal computers, laptops, mobile devices, tablets, Smart TV-based technology, Smart Watch-based technology, Connected Car-based technology, Connected Home-based technology, and/or other web-based/connected devices, platforms, etc. Actions performed by the "system" may correspond to actions implemented by Server 112. Server 112 may be configured to communicate with various third-party network equipment, for example to facilitate a system for allowing users to post, embed and otherwise allow streaming of their content from a 3rd party media-streaming sources (e.g., Vimeo, SoundCloud, BandCamp, YouTube, etc.), for example provided it is their content (e.g. the user posting is the copyright holder of said content) and the content does not conflict with Terms of Use.

The system may be accessible via web, mobile, smart TV, smart home, smart watch applications designed to serve Independent Artists, Producers, Publishers, and other Original Content-Creators in addition to fans of their respective arts, trades, crafts, and creations by providing a platform that enables them to share their work and make it more visible, discover-able, and otherwise accessible (for Independent Artists, Producers, and Original Content-Creators) and discovering new Independent Artists, Producers, and Original Content-Creators (for fans and enthusiasts). The system features "Arenas" (e.g., such as "7G Member Arenas," "7G Music Arenas," "Signature 7G Arenas," etc.) which may aggregate content that have a common location, genre, and time. For example, as an arena may be created for the city of San Francisco that is for alternative rock music, and the arena may be "active" for 30 days. In this manner, the arena may be seen as an efficient mechanism for aggregating content that users interested in San Francisco alternative rock music may search through during the 30 days the arena is active. The time limitation may be used to ensure that posted media remains relevant or fresh for users searching for such content.

Examples of arenas may include various "Members Arenas". Member Arenas may be created based on user proposals (e.g., a user may suggest an arena be created for Techno music in Tokyo) and other users of the system may vote for the proposals. The system may establish the arena when voting activity results in the number of votes for an arena proposal exceeding a threshold and/or when an arena receives the most votes over a given time out of a group of possible arena proposals. This user-driven aspect of "Members Arenas" make it possible for any user to propose their own idea for a 7G Arena, for example which the system will actually host if it is among the top (e.g., three) user proposals when a proposal clock expires. The voting may be based on terms of votes and/or Total Stars (e.g., each user may be allowed to post between 1-5 stars for a given proposal). This user-driven trait of Members Arenas also means that any 7G user may eventually have relevant content to Post (e.g. non-fiction, podcast, fashion, etc.) to a 7G Arena at some point.

Figure 2:
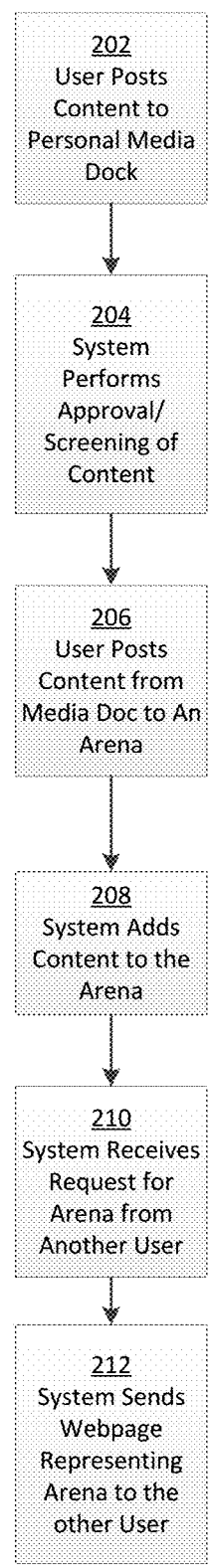
FIG. 2 is a flow chart for an example process for posting content to an arena.

FIG. 2 provides an example flow for posting content to an arena and proliferating the arena to users of the system. For example, at 202 a user may post content to their personal media doc. At 204 the system may perform approval/screening of the content. For example, the system may ensure the user is authorized to publish the content and/or may ensure the user holds the copyright to the content. At 206 the system may receive a request from the user to post the content from their media doc to a specific arena. The system may determine whether the content conforms to the arena requirements (e.g., location, time, genre). For some arenas, the user requesting to post content may need a code or key provided by the system in order to post content. The key may be provided based on the posting user having previously posted similar content and/or based on the posting user having previously had the content or similar content receive a specific number of GreenLights or stars. At 208, the system may add the content to the arena from the user's media docs. Adding the content to the arena may make the content available to other users in the arena that request to view the arena page.

At 210, the system may receive a request from another user to view the arena page. At 212 the system may send a webpage representing the arena and that includes the content added at 208 to the user that sent the request to view the arena.

The arena framework may include several filtering and sorting options that are available to users. The arena framework also features methods of organizing and aggregating digital content, including aspects such as layout and site flow, in order to maximize user-friendly navigation and discovery thereof. Specific filtering and sorting options facilitate the process for users to locate arenas of interest to them, while other filtering and sorting options used within specific arenas enable users to locate content and content creators (e.g., Independent Artists, Producers, Publishers, and Content-Creators that appeal to their tastes in a more efficient, rewarding, entertaining, Independent Artist-friendly way) that are of interest to the user within the arena.

Arenas can be used to host, organize, aggregate, and stream of content-based, thematically-related, location-specific digital content. The arenas can be tools for content creators (e.g., Independent Artists, Producers, Publishers, and other Content-Creators) to post, share, and monetize their work while also providing other users (e.g., fans and enthusiasts) with tools to discover, rate and otherwise connect with the content creators of interest to them as the content creators add to their respective collections (e.g. music, art, movies, books, etc.). This network effect (e.g. More Artists post to 7G=better for Fans {more content, quality, diversity, etc.}; More Fans use 7G to discover content=better for Artists {more opportunity to earn new fans, gain additional support, increase sales, etc.}) ultimately enables Independent Artists, Producers, Publishers and Content-Creators to increase the visibility of their work in their respective genres, art forms, and crafts with relevant audiences while also enabling said audiences to discover content of interest to them in a far more streamlined, entertaining, Independent Artist-friendly method than any comparable web-based applications.

7G utilizes a method for organizing, aggregating, and enabling access to—and stream-ability of—digital content, digital representations of real content (e.g. image of a sculpture), etc. This method enables 7G users to "hone in" and better discover, organize, access and otherwise locate digital (and real) content of interest to them that has been posted to 7G Arenas by other 7G users.

A "GreenLight" Framework may be used to users to show interest in other users and/or content. For example, a given user may be allowed to "GreenLight" (e.g., indicate an interest in) other users, any user content, an arena, a forum, a thread, a notes, a blasts, etc. Generally speaking, users may GreenLight any users, content, etc. that they appreciate, want to show support for, think is cool, etc. In this sense, the GreenLight Framework can serve as a tallying mechanism. The users, content, etc. that have been awarded the most GreenLights may be the most compelling, talented, entertaining users and content on the site, for example.

The 7G GreenLight Framework also provides users with unique methods to filter and sort users, content, Blasts, Notes, etc. The GreenLight Framework also enables users to control and manage the view-ability of content featured on their respective 7G user profiles and/or in arenas. For example, 7G users may adjust their settings and sort content according to the following four following "GreenLight Populations" that every 7G user has: "GreenLight Pop As" users whom the accountholder has mutually exchanged GreenLights with, "GreenLight Pop Bs" users whom the accountholder has GreenLit, but have not GreenLit the account holder, "GreenLight Pop Cs" users who have GreenLit the accountholder, but have not been GreenLit by the accountholder, and "GreenLight Pop Ds" users who have not GreenLit the accountholder or been GreenLit by the accountholder. The 7G GreenLight Framework is based on a more nuanced system of categorizing relationships between users, such as "friends" or "not friends" and "following" or "not following," for example. The different GreenLight Pops A-D enable users to more specifically control what information of theirs is viewable by other 7G users. 7G users have the ability to edit and preset the amount of information viewable on their respective profiles for each of their respective GreenLight Pops A-D. 7G users may also opt to receive notifications regarding 7G Arenas and 7G Forums they have GreenLit from their respective "7G Gear" icons on their profiles. 7G users may discover other 7G users and content by reviewing the 7G users, content, Forums, Threads, Notes, and Blasts that the 7G users comprising their respective GreenLight Pops have GreenLit themselves.

Figure 3:
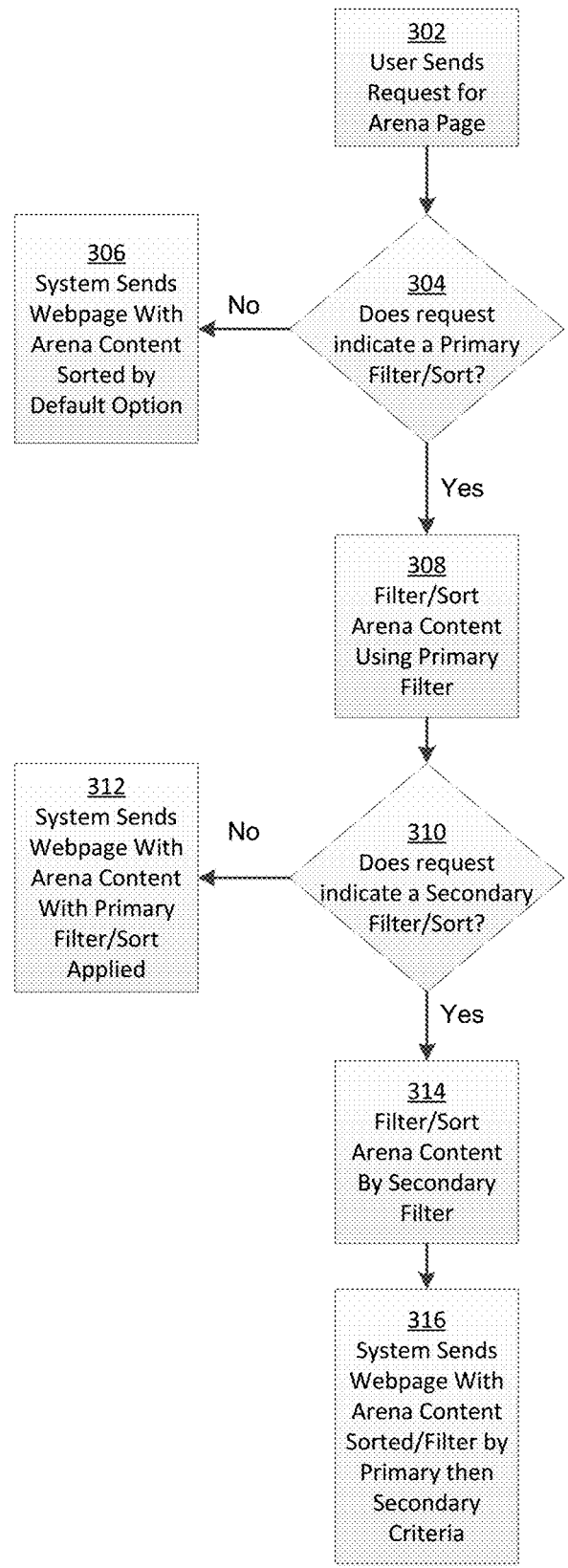
FIG. 3 illustrates an example process for sorting content.

For example, FIG. 3 provides an example flow for the system to filter and/or sort content within the arena for viewing based on an individual user request. Although the example in FIG. 3 illustrates a primary and secondary filtering (and/or sorting) protocol, more or fewer filtering/sorting criteria may be used. For example, at 302 a user may send a request to the system to view a specific arena page. At 304, the system determines whether a primary filter and/or primary sort criteria is associated with the request. Although filters will be described in this example, the criteria may also be used to sort the content that is to be displayed. For example, the system may determine at 304 that the request has a primary filter criteria of "Population A" for the content within the arena. In this case, the version of the arena page would filter out any content that was not added by a user in the requesting user's Population A (e.g., mutual GreenLights). Any population may be used as the primary filter/sort criteria. As an example, the populations may be used to sort content rather than as a filter (e.g., first Pop A, then Pop B, etc.).

If no filters/criteria are indicated in the request, than the system at 306 may send the webpage representing the arena to the requestor including all arena content (or a first portion thereof if the arena content is voluminous) sorted according to a default sort, such as most total GreenLights. If the request does indicate a primary sorting portion, then at 308, the system may sort according to the primary criteria. For example continuing with the Pop A example above, the system may filter to include content added by users in the requestor's Pop A and remove other content (e.g., content associated with other populations).

At 310, the system determines whether a secondary filter and/or secondary sort criteria is associated with the request. If not, at 312 the system sends the webpage with the arena content with the primary filter/sort criteria applied (e.g., showing Pop A content in the example). If the system determines there is a secondary filter/sort criteria, for example sort according to most overall GreenLights for the content or sort by time uploaded, then at 314 the system sorts or filters the content that passed through the primary filter/sort by the secondary criteria. At 316, the system send content sorted/filtered by the primary criteria then sorted/filtered according to the secondary criteria.

Examples of the system's method of organizing and aggregating arenas themselves may utilize the following sequence of filters (e.g., with the available options for each subsequent filter dependent on the menu item the user selects in the preceding filter): (1) "7G Arena-Type" (e.g. "7G Music Arenas," "Signature 7G Arenas," and "7G Members Arenas"); (2) "Primary Category" (e.g., Songs or Videos for "7G Music Arenas;" Boarding or Design for "Signature 7G Arenas," etc.), the options for which appear on the "Landing Page" for the respective "7G Arena-Type" that the 7G user selects from the homepage (3) "Sub-Category" the options for which depend on the 7G user's selection from the "Primary Category" filter that precedes the "Primary Category" filter, (e.g. Rock or Jazz for "7G Music Arenas" {>Songs or >Videos}; Surfing or Fashion for "Signature 7G Arenas" {>Boarding or >Design}); (4) "Location", which may include regions of countries or continents (e.g. the West Coast, sub-Saharan Africa), cities, towns, provinces, neighborhoods, counties, states and other geographically-recognized areas (e.g. Oakland Calif., San Francisco Bay Area), neighborhoods (e.g. The Mission, Tribeca), and even figurative locations (e.g. "the Pacific" or "fishing"). For example, after selecting Signature 7G Arenas>boarding>surfing a 7G user would then have the ability to select among different locations for which the system is hosting Signature 7G Surf Arenas (e.g. Ocean Beach, Half Moon Bay, Santa Barbara, the West Coast, Pipeline, etc.). System users can post or share their respective content, and/or stream, rate, and otherwise interact with content and content-creators, who post their respective content to various "time-sensitive" (i.e. May 2015, June 13-19, etc.) 7G Arenas. Other than the specific Arenas to which 7G users will post their respective content, a "7G homepage" may be accessed where each respective "7G Arena Landing Page" can be accessed—as well as the "7G Arena Landing Pages" (see FIG. 3) which not only provide 7G users with "Primary" and "Sub-Category" filter-ability (as described above), but also enable 7G users to sort and access 7G Arenas based on ample additional criteria (i.e. 7G Arena-specific metrics) including "Location," "Total GreenLights" (total awarded to all content posted to each respective 7G Arena), "Total Votes," "Total Stars," etc. tallied and archived for each respective Arena "7G Arena Framework."

The system's arena-layout method allows fans and enthusiasts to more quickly locate and discover content and content-creators that they find interesting, entertaining, etc. while also providing content-creators with an efficient and navigable means for sharing and promoting their own respective content. The system (e.g., admins) can roll out/launch new 7G Arenas, adjust the clock/running time for each 7G Arena, and allow posting to 7G Arenas, etc.

7G Members Arenas may feature a slightly different layout from "7G Music Arenas" and "Signature 7G Arenas"

in order to ensure better visibility of the various information and components that comprise the thumbnail views for each respective 7G Arena Proposal. 7G will host unique 7G Arenas specifically tailored to the specifications of the highest performing 7G Arena Proposals in the 7G Members Arenas (hosted and archived on a monthly basis) as determined by Total Stars and/or GreenLights and/or 7G Accolades and/or other metrics and unique combinations thereof.

7G Arena participants and users, in general, may be awarded and otherwise acknowledged with unique 7G Accolades (i.e. badges/icons) designed to recognize the unique location, subject-matter, and 7G activity or achievement that the 7G Accolade is being awarded for. 7G Accolades may be triggered by users passing certain thresholds with different metrics (e.g. Total Votes, Total Stars, Avg Star Rating, GreenLights, Notes, Blasts, Lucky 7s, etc.).

Certain Accolades will grant additional Arena access to those users who are awarded them on account of their Arena participation and their respective activity and achievements throughout the platform. Said additional access to various exclusive or otherwise restricted 7G Arenas, for example, will be administered through bonus "7G Shades" which grant 7G Arena access to fans and enthusiasts and bonus "7G Keys" which enable users to post their respective content to Arena that may be awarded along with certain select Accolades. There may be 7 tiers of Accolades, each of which features set numbers of Bonus Points administered along with the accolades. Furthermore, certain Accolades awarded in the 7G Arena context will feature unique, additional bonuses depending on the 7G activity or achievement that each respective 7G Accolade is intended to recognize and reward. For example: (1) ticket distribution assistance—provided, arranged or otherwise made available by 7G—to concerts, art exhibits, and independently-produced film premieres, for example, and/or (2) access to a suite of services (e.g. consulting, recording, mixing, mastering, etc.)—provided, arranged or otherwise made available by 7G—for the direct benefit of the Independent Artists, Producers, and Content-Creators able to earn specific 7G Accolades, and/or tangible prizes and awards (e.g. music equipment, marketing campaigns, record release parties, etc.).

Arenas may include an "Arena Sponsors Framework" which is may be a different/unique for of digital advertising. For example, Arena Sponsors are intended to be as relevant to, and respected by, users participating in that specific Arena as possible while still showing maximum respect for users' privacy rights and not interfering or taking attention away from the Independent Artists posting to the different 7G Arenas.

For example, each unique (e.g., time-sensitive) Arena—live or archived—may feature a maximum of seven official "Arena Sponsors"—one "Primary Arena Sponsor" and a maximum of six "Standard Arena Sponsors." Three of the official "7G Arena Sponsors'" respective badges may appear at any given time. The "Primary 7G Arena Sponsor's" badge will appear centered at any given time in a "live" or "archived" Arena (e.g., an archived arena may correspond to an arena whose "time limit" or time criteria has expired but that the arena remains accessible on the site), with the respective "Standard Arena Sponsor" badges located to its immediate left and right. Promotional links corresponding to each respective "Arena Sponsor" will appear, one-at-a-time, directly below the three 7G Arena Sponsors' badges (appearing at any given time) in a designated "Arena Sponsor Promotion Area." The "Arena Sponsor's" respective promotional links will refresh at periodic intervals to feature each Arena Sponsor's various promotions for approximately 10 to 15 seconds at a time. The "Primary 7G Arena Sponsor's" respective promotion will be featured at every third interval, and the "Standard 7G Arena Sponsors'" respective promotional links will split time (as equally as possible) amongst themselves (and the Primary 7G Arena Sponsor). 7G reserves the right to award complimentary 7G Arena sponsorship opportunities to various companies, causes, non-profits, artists, venues, theaters, etc.

7G users may post their content to Arenas from their respective Media Docks or directly from 7G Arenas through a "Key-hole" icon link featured in the center of every 7G Arena currently allowing submissions. The "Key-hole" icon/link enables 7G users, first, to post their Arena-relevant content remotely to the 7G Arena from their respective 7G Media Dock and, then, to post said content to the relevant 7G Arena provided they possess the necessary "7G Key" for that particular 7G Arena (e.g. unique 7G Key-based icon system employed to manage users respective ability to post to each respective 7G Arena).

"7G Content Posting System" illustrates the systems' system for managing/controlling 7G users' respective "post-ability" to 7G Arenas and "view-ability" of aggregated content in 7G Arenas. In a similar way that "7G Key" icons enable 7G users (e.g. Independent Artists and content-creators) to post their respective content to 7G Arenas, the "7G Shades" icons enable 7G users to view, stream, and otherwise access said content on an Arena-by-Arena basis (e.g. "7G Shades" that grant a 7G user access to a certain 7G Arena won't necessarily enable that 7G user to access another, perhaps more exclusive or otherwise restricted, 7G Arena).

For example, 7G Independent Artists, Producers, Publishers and Content-Creators may post their respective content (e.g., songs, videos, etc.)—or digital representations thereof (e.g. photo of a sculpture)—from 7G-approved 3rd party sites (e.g., YouTube, vimeo, soundcloud, bandcamp, imgur, instagram, etc.) to their respective 7G Media Docks and, from their 7G Media Docks, to various time-sensitive, location-specific, content-based 7G Arenas.

The "7G Content Posting System" facilitates synergy among 7G Independent Artists', Producers', and Content-Creators' respective networks, fans and enthusiasts for the benefit of both the Independent Artists as well as the fans and enthusiasts. By posting their content to their respective 7G Media Docks and 7G Arenas from 7G-approved third party sites that 7G users have already uploaded or otherwise made their available on, For example, 7G users may upload content they've created to their respective 7G Media Docks from any 7G-approved 3rd party streaming platform that maintain and implement certain safeguards such as their own respective DMCA policy, for example, and other measures implemented for the protection of copyright-holders.

7G users may initiate the "Content-Posting" process from their user profiles through a link that prompts them to upload their respective content from a 7G-approved 3rd party. The "7G Content Posting Framework" employs an automated review system to ensure that copyrights and other intellectual property rights are not infringed. If the "7G Content Posting Framework" approves the content, said content will post to the 7G user's respective 7G Media Dock. 7G users, through use of 7G Keys, may then post content they have created to specific 7G Arenas from their respective 7G Media Docks or from the actual 7G Arenas themselves. From the 7G user's media dock, the respective 7G accountholder may then post to one or more Arenas. At this stage in the sequence, the content may be subjected to an automated review process to ensure the content does not conflict with 7G's terms of use and is relevant to the specific 7G Arena the 7G user is attempting to post to. If the content is approved, it will post to the given 7G Arena. If the content is denied at either stage, 7G admin may provide a reason for the denial in the message that automatically generates anytime a 7G user attempts to post their content to a 7G Arena and is denied. 7G users will also receive messages when their content is approved at either stage (posting to their respective 7G Media Dock or posting from their respective 7G Media Dock to an actual 7G Arena). This method also enables 7G to ensure that content posted to user profiles or 7G Arenas does not infringe the rights of other copyright holders, and the method also ensures said content does not violate 7G's terms of use.

The "7G Members Arena Proposal System" enables 7G users to propose their own unique ideas for potential 7G Members Arenas from the "7G Members Landing Page" or directly from one of the current 7G Members Arenas (i.e. Arenas for each one of the three 7G Members Arena Proposals that are awarded the "Most Total Stars" the previous calendar month). These may also be posted from other 7G Arenas As noted above the system may employ methods for organizing and aggregating 7G Arenas based on a hierarchical set of characteristics/filtering options, each set of which depend on the user's immediately preceding filtering selection. For example "7G Arena Type" (Music, Signature, Members) may be a primary criteria, Primary category may be second, Sub-category may be third, location may be third, "Metrics" (e.g., GreenLights, stars, etc.), may be fourth. The categories may establish a filter- and sort-ability of 7G Arenas based on cumulative tallies of unique metrics accrued by all participants in each respective 7G Arena, such as Total GreenLights (for users, content, Notes, and Blasts), Total 7G Accolades, Total Notes (posted to Arena content), Total Blasts (referencing the specific 7G Arena), Total Votes, Total Stars, Average Star Rating, etc.

"7G Accolades:" may serve as one example of how system is relevant to the respective 7G Arenas and Forums where the 7G Accolades are earned and awarded, but also to individual 7G user profiles and throughout other areas of the site, such as the 7G homepage and 7G Arena Landing Pages. The hypothetical 7G accountholder's profile page in this example is displaying 7G Accolades that the user has been awarded for their "7G Members Arena Proposal"-based achievements. A viewer of this user's profile page (with the requisite GreenLight-based access) would have the ability to view other 7G users who have earned specific 7G Accolades by 'selecting' the 7G Accolade itself. This ultimately benefits the artists and fans comprising 7G's user-base. The artists benefit from the increased "discover-ability" (7G Accolades provide an alternative, indirect method of discovery), and the fans also benefit from this additional method of discovering other artists of interest to them. The "7G Accolade Framework" is designed not only to recognize and reward various 7G user activity and achievements, but also to provide 7G users with an efficient, original, useful system of discovery (e.g. "by 7G Accolade").

The system may be configured to allow for "Live 7G Arena Submissions" from the profile pages of 7G users who have "Live Submissions" currently posted to 7G Arena(s). A hypothetical profile-viewer (with the requisite "GreenLight Access") may view and select the 7G Arena names listed in the upper panel of a given user's profile page when "Live Arena Submissions" is selected. If a 7G Arena name is selected from this area of a 7G user's profile, the profile-viewer who makes the selection will be redirected specifically to that 7G accountholder's content wherever it is in the Arena the accountholder posted it to.

7G users may also view and otherwise monitor their respective 7G Keys and 7G Shades, which enable their respective 7G Arena access (e.g. ability to post and/or view content) from the user profile pages, in addition to "7G Accolades" they have been awarded, "7G Blasts" made by members of their respective "GreenLight Pops," "Notes" that have been posted to their content by other 7G users, etc.

A "Bracket Format Arena", (e.g., unlike open format arenas, which may not feature content-submission deadlines, eliminations, or rounds of voting) may include a specific number of voting rounds, with set numbers of heats for each round, as well as eliminations and acknowledgment of each participant's "place" in terms of Total Stars, for example, when time expires. The "Bracket Format Arena" also features a "Path to the Final Heat" for one of the 7G users who does not "advance" from their respective heat at the culmination of the first round of voting. The "Bracket Format Arena" enables 7G users to stream and to rate content (among other activities) posted any "Bracket Format Arena" by, for example, 48 unique 7G users (selected in a variety of ways—for example, sometimes based on their earning of certain 7G Accolades, sometime based on their achievements within a specific 7G Arena, sometimes just based on the first 48 7G users to register).

In the first round, each of the 48 unique 7G users is randomly grouped into one of twelve heats that features the content of four users. 7G users (e.g. fans) are allowed to cast daily votes for the duration of the first heat (e.g. 7 calendar days), after which time the two 7G users in each heat who are awarded the most Total Stars advance to the 2nd Round. The 24 unique 7G users who are not awarded enough Total Stars to advance following the first round of voting are then randomly grouped into one of four heats, each of which features 6 unique 7G users, and collectively comprise the preliminary stage of the "Path to the Final Heat." Only two of the six unique 7G users advance from each of the four respective heats in the preliminary stage of this unique 'elimination bracket', which is governed by the same clock and timeline, in general, that governs the second round of voting for users who do advance from their respective first round heats. The 16 total 7G users who do not advance from the preliminary stage of the "Path to the Final Heat" are effectively eliminated from contention and awarded places 33-48 along with corresponding 7G Accolades and Bonus Points based on where they placed, which is determined according to Total Stars each 7G user is awarded, cumulatively (including votes cast in the first round). In the second round of voting, the 24 unique 7G users who advance from the first round based on Total Stars are randomly grouped into one of six heats, each of which features four total users. 7G users (e.g. fans, enthusiasts, other Artists, etc.) are allowed to cast daily votes for the duration of the 2nd Round (e.g. 6 calendar days), after which time the two 7G users who are awarded the most Total Stars (only counting that round) advance to the third round from each of the six respective heats. The 12 total 7G users who do not advance from the 2nd Round based on Total Stars awarded in each of the six respective 2nd Round heats are then grouped into one heat for the final stage of the "Path to the Final Heat" along with the eight unique 7G users who advance from the preliminary stage of the 'elimination bracket'. In the 3rd Round, the 12 total 7G users who advance from their respective 1st and 2nd Round heats are then randomly grouped into one of three heats, each of which features the content of 4 total users. 7G users are allowed to cast daily votes throughout the duration of the 3rd Round (e.g. 5 calendar days), after which time the 7G user who is awarded the most Stars advances to the Final Round from each of the three respective heats. The 16 total 7G users who do not advance from the 3rd Round (but did advance from the 1st and 2nd Rounds) are effectively eliminated from contention and awarded 'places' 5-16 along with corresponding 7G Accolades (some of which include 7G Keys and/or 7G Shades) and Bonus Points based on where they place, which is determined according to the amount of Total Stars each 7G user is awarded during the 3rd Round, only. Additionally, at the culmination of the 3rd Round of voting, only the lone 7G user (among the twenty total 7G users vying to advance to the Final Heat), who is awarded the most Total Stars (during the 3rd Round, only) advances to the Final Heat of the "7G Arena—Bracket Format" from the 'elimination bracket'. The 19 total 7G users who do not advance from the 'elimination bracket' are effectively eliminated and are awarded 'places' 32-17 along with corresponding 7G Accolades and Bonus Points based on where they placed, which is determined according to the amount of Total Stars each 7G user is awarded with respect to one another during the 3rd Round, only. 7G users are allowed to cast daily votes for the 4 unique 7G users who advance to the Final Heat (three 7G users who advance from their respective heats in each of the first three Rounds, and one 7G user who advances from the 'elimination bracket') for the duration of the Final Round (e.g. 7 calendar days). At the culmination of the Final Round, the four 7G users who advance to the Final Heat are awarded 'places' 1-4 along with 7G Accolades (some of which feature 7G Keys and/or 7G Shades) and 7G Bonus Points (e.g. 15,000, 30,000, 50,000, 100,000 Points) based on where they place, which is determined according to the amount of Total Stars each of the four unique 7G users is awarded in relation to one another during the Final Round, only.

"7G Arenas" may be archived. Arenas may also be awarded GreenLights that may continue to be awarded beyond Arena expiration, and may be re-submitted to the (e.g., monthly) Members Arena Proposals. 7G users' archived "7G Members Arena Proposals" may be accessed by profile-viewers with the requisite "GreenLight Access" necessary to view such information according to accountholders' respective GreenLight Pop settings.

A "Members Arena Landing Page," may be used to aggregate and archive "7G Members Arena" data on, for example, a monthly basis, and may be accessed by selecting the "7G Members Arena" icon from the 7G homepage. All aggregated 7G Members Arenas may be filtered by month and/or subject-matter, for example, and then sorted based on metrics, location, Time Remaining, etc. 7G users may also access specific "Live" and/or archived "7G Members Arenas" from the "7G Members Arena Landing Page" in addition to "Live" and/or archived "7G Members Arena Proposals" (the highest rated of which are rolled out into their own unique, time-sensitive 7G Members Arenas).

"7G Members Arena Proposals" which a may be used to suggest an Arena that is hosted for, and archived, on a monthly basis. 7G users' respective "7G Members Arena Proposals" may be sorted based either on the number of GreenLights that each respective 7G Members Arena Proposal has been awarded or, alphabetically, by the first letter of the first word of each respective 7G Members Arena Proposal, through use of the "Proposal" hybrid heading, for example.

A "7G Arena Landing Page Framework" may employ several systems, one of which involves each respective "7G Arena Landing Page" (e.g. 7G Music, Signature 7G, 7G Members), and aggregates and organizes data, and facilitate 7G users' access to specific 7G Music Arenas, Signature 7G Arenas, and 7G Members Arenas—including the specific 7G Arena selection process, and navigation of the entire sequence thereof. The functionality may include Primary/Sub/Location and GreenLight/L7 Pop Filter-ability and various metric-based Sort-ability.

User Profiles may be viewed by other users in the system. However, the information available on a first user's profile page may be dependent on which population the second user viewing the profile page belongs to relative to the first user. For example a user may adjust the "view-ability" (i.e. privacy) of their profile information for their respective profile-viewers based on their settings for each of their respective "GreenLight Pops A-D" and/or "Lucky 7s." For example, 7G users have the ability to embed 3rd party crowdfunding widgets, links enabling their respective profile-viewers to purchase tickets to their shows without ticket fees (e.g. Ticketmaster, StubHub, etc.), and links to digitally download or stream their content from various providers of 7G users' choosing. Which aspects are available for viewing a given user's profile may depend on which GreenLight Population the user view the profile is in with respect to the user whose profile is being viewed. For example, if user2 is in population A relative to user1, then user2 may be allowed to view the entirety of user1's profile. If user3 is in Population B relative to user1, then a first portion of user1's profile (e.g., archived blasts) may be un-viewable by user3 but other portions (e.g., record room) may be viewable by user3. Continuing with this example, if user4 is in Population C relative to user1, then user4 may allowed access to a different portion of user1's profile than user2 and/or user3. In an example, users in different populations may each be allowed to view a certain profile information (e.g., a blast) but the profile information may be different and/or or targeted to a specific population (e.g., on is allowed to view the most recent blast that was indicated as being viewable to a subset of populations, while the other is allowed to view the most recent blast that was indicated to be available to all populations)

The "7G Info Aggregation System" enables 7G users to transmit and to access various types of information directly to, and from, their respective GreenLight Pops A-D and/or "L7 Pops" in every 7G user's respective profile page. The "7G Info Aggregation System" also enables share-ability of 7G users' profiles and 7G users' content that they have posted to their respective Docks.

Examples of 7G's system for aggregating digital content can aggregate other information related to the 7G users who create and post it, in addition to information related to the content itself (e.g. where it may be digitally downloaded, where it may be streamed, where and when it is scheduled to be performed live, etc.). The "7G Info Aggregation System" also enables 7G users to make their respective information (that they deem relevant to their 7G activity and/or goals, etc.) accessible and otherwise visible to fans, enthusiasts, and potential collaborators, based on each respective 7G user's GreenLight Pop A-D and Lucky 7 settings. Also illustrates how 7G Accolades earned in 7G Arenas, through 7G users' various types of 7G activity and participation, etc. may be viewed on 7G user profiles depending on 7G users' respective "GreenLight Pop A-D" and "Lucky 7" settings (i.e. privacy settings).

The "7G Media Skin" (aka the "7G OVERLAY" or "Overlay") which amalgamates various data, data sets, other content, etc. from 7G users' respective profiles along with data, data sets, other content, etc. specifically related to 7G users' respective content, which may be hosted by 7G and/or 7G-approved 3rd party streaming platforms. 7G users may stream content posted to their respective (media) "Docks" or to 7G Arenas. Likewise, 7G Overlays may feature supplemental content (e.g. photos, videos, audio clips, etc.) that 7G users may attach or otherwise include with their respective 7G Members Arena Proposals. Such supplemental content may be hosted by 7G or by 7G-approved 3rd party streaming-, image-, or audio-streaming platforms.

The "7G Media Overlay" compiles various metrics and information related to specific content 7G users post to their respective 7G "Docks," to content 7G users post from their respective 7G Docks to unique 7G Arenas, and to supplemental content 7G users post to their respective 7G Members Arena Proposals. Specific information and metrics associated with the respective featured, streamable content include "Notes" (e.g. digital images or brief audio or video clips tied to content, posted by other 7G users), "Blasts" (e.g. 7G user broadcasts which they have the ability to transmit to any and/or all of their respective GreenLight Pops A-D in any desired combination), 7G Accolades (e.g. badges and icons to acknowledge and reward various 7G user achievements and forms of activity), GreenLight Pop-enabled comments, purchase and/or streaming information, upcoming show and ticket information, etc. The content itself may also be rated (using a 5-star scale), GreenLit, added to 7G users' respective Lucky 7s (i.e. 7 daily favorites), etc. Lucky 7 status may override a 7G accountholder's respective GreenLight relationship with other 7G users. For example, a member of an accountholder's respective GreenLight Pop C may be granted additional profile access (beyond Pop C access) if the accountholder awards a Lucky 7 to him or her.

Thus, a lucky 7 may be considered a time limited (e.g., daily) mechanism to allow a user access to a different population (e.g., Pop A) and its associated access rights, while reverting to the user's previous access rights/population after the Lucky 7 time limit has expired. Although in the Lucky 7 example a given user may be allowed to designate 7 different users per day as a member of their Lucky 7, different number of users (e.g., 1, 2, 8, 15, etc.) and different lengths of time (e.g., 1 week, 1 hour etc.) may be associated with Lucky 7 access.

Figure 4:
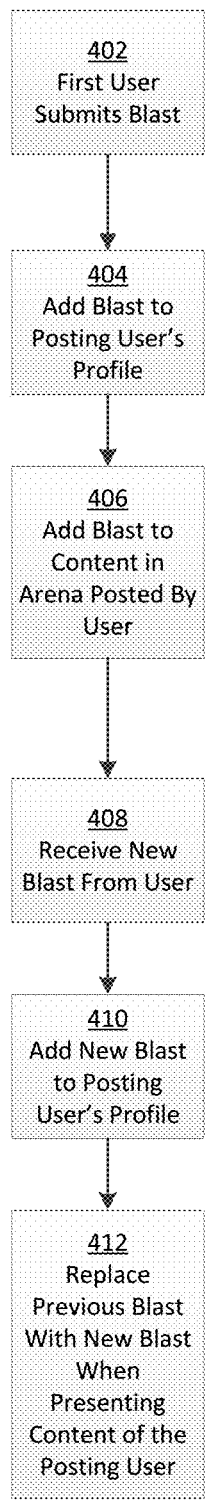
FIG. 4 illustrates an example process for sending a blast or message.

FIG. 4 illustrates an example process for processing user "blasts." For example, a blast can be considered a comment or information posted by a user. The blast may or may not be associated with specific content. At 402, the system may receive a new blast from a user. The blast may be a text item and/or other digital content. At 404, the system may add the blast to the user's profile who added the blast. The blast may be displayed with other, previous blast made by the user on the user's profile page. At 406, the system may associated the user's recent blast with content added by the user and add the blast to be displayed with the content. For example if the user who sent the blast has added first content to a first arena and second content to a second arena, the blast may be automatically displayed with the first and second content in their respective arenas. At 408, a new blast may be received from the user. At 410 the new blast may be added to the profile page of the user and may be displayed with the blast received at 402. However, at 412 the system may automatically replace the blast from 402 with the new blast received a 408 with the user content. In other words, the user's most recent blast may be linked to content added by the user and the most recent user blast may be displayed with the content in the arenas.

The user's blast history may be archived in a profile page for the user. For example, a the Record Room may be used to depict the system by which 7G accountholder's Blasts (located in the upper left of 7G user profiles directly below the profile picture) may be GreenLit or awarded Lucky 7 status by other 7G users. 7G users, specifically profile-viewers in this instance, may GreenLight accountholder's Blasts without having GreenLit the 7G accountholder, presuming they have access to view the accountholder's Blasts based on their respective GreenLight Pop-based or L7-based relationship. GreenLighting of a 7G user functions independently of GreenLighting of a 7G user's Blast.

A content blast may enables users to post blasts specifically associated with content that they post to their 7G Docks or to 7G Arenas. The '7G Content Blast' system is managed and functions independently, albeit similarly, to the '7G User Blast' system (e.g., described with respect to FIG. 4).

Various filtering options for 7G user profiles may be used to enables 7G users (including profile-viewers with requisite access) to filter Blasts according to accountholders' respective GreenLight Pops A-D, and/or their respective Lucky 7 Pop. For example, a user may filter all system blasts (e.g., for the entire 7G system) to view blasts transmitted by one of their respective populations. For example, the user may filter blasts in the system for their Population B to view blasts sent by users that they have GreenLit but that have not GreenLit the viewing user. Secondary (or tertiary) filters may then be applied based on one or more of (a) "All Blasts" site wide (tied to 7G users, 7G user content, or 7G user Notes); (b) "Blasts GreenLit by the (respective) accountholder" (associated with users, content, or Notes); and/or (c) the (respective) "accountholder's Blasts" associated with their respective 7G user profile, their content, or Notes they post. All Blasts may be targeted to, or otherwise accessible by, specific GreenLight Pops and/or Lucky 7s. Said filtering options enable communication and transfer of information, in general, based on additional, more nuanced criteria, than simply 'friends'—'not friends' or 'following'—'not following', for example. For example, when sending a blast the user may indicate which populations (e.g., A, B, C, and/or D) should be allowed to view the blast.

Although the most recent blasts may be automatically linked or posted to a user's content, not all users viewing that content may be able/allowed to view the blast. For example, if a given blast is indicated by the blasting user to be allowed only for their Pop A, then a user in that user's Pop D will not be allowed to view the blast even if that user is allowed to view the content (e.g., in an arena). Rather, depending on the privacy settings of the user either no blast would be available to the Pop D viewing user or the most recent blast to be indicated to be allowed for Pop D may be displayed with the content when the Pop D user views the content.

A 7G users' most GreenLit Blasts may be featured along with general updates and recaps summarizing Arena activity, metrics, etc. 7G users may access 7G Arena Blasts from their respective 7G user profiles for 7G Arenas they have GreenLit.

Figure 5:
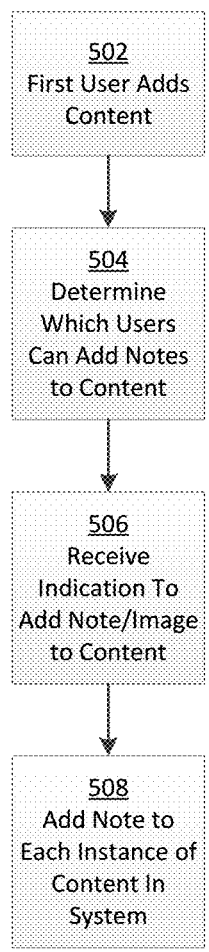
FIG. 5 illustrates an example process for associating an image (e.g., a Note) with content.

FIG. 5 illustrates an example process for utilizing "Notes" with content. When used herein the term "Note" may be refer to an image that has been associated with a specific content item. For example, the content item may be located in a user's media dock and/or posted to an arena. Notes may be added by the user that added the content to the media dock and/or arena. Notes may be added to content by another user that has GreenLit the content. In an example, some population may be allowed to post a note to a content item and other populations may not, for example based on the settings specified by user that added the content to the media dock and/or arena.

For example, at 502 a first user may add content. For example, the content may be a song written by a user and added to the user's media dock. In an example, the content may be content added to an arena by a user (e.g., from the user's media dock). At 504, the system may determine which other users in the system are allowed to add notes to the content. For example, the user that added the content at 502 may specify which populations (e.g., relative to the user that added the content) are allowed to add notes to the content. In an example, notes may be allowed to be added by any population provide that the user adding the note has GreenLit the content.

At 506, a user may send a request to add a note (e.g., an image) to the content. The user may be the first user that added the content at 502 and/or may be a different user in the system. On condition that the user adding the note is allowed to add the note (e.g., based on the determination at 504) then the note is then associated with the content. At 508, the Note is then associated with each instance of the content within the system. For example, if the first user has added the content to multiple arenas and the note was added to an instance of the content in one of the arenas, then the system automatically distributes the note to other instances of the note within the system (e.g., to the user's media dock, other arenas, etc.). In this manner, the notes are consistent across each instance of the content across the system.

There may be a predefined number of notes allowed to be associated with given content. For example, up to nine notes may be allowed to be associated with content at a given time. In an example, if more notes than the number allowed to be displayed are added, then they system may still associated the note with the content, but may rotate which notes are presented with a given instance of the content. In addition to applying notes to content, notes may also be applied to an arena. For example, users that have GreenLit an arena may be allowed to post notes to the arena.

Figure 6:
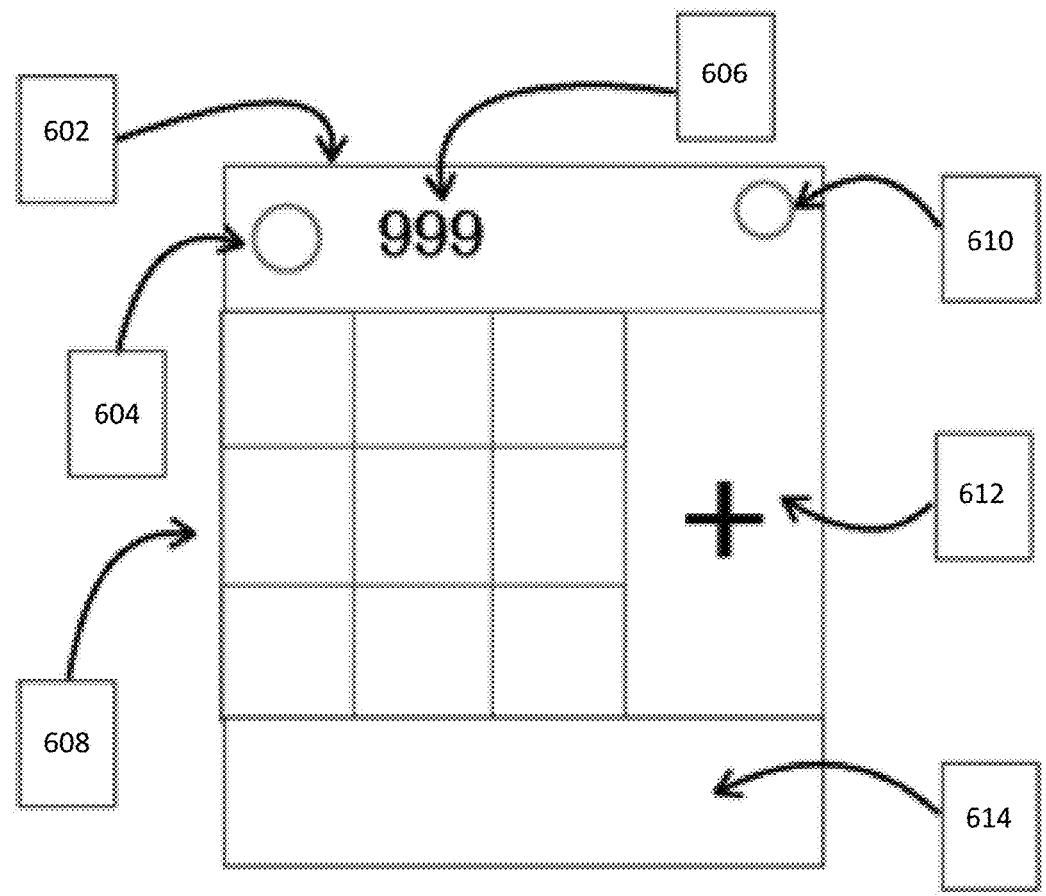
FIG. 6 illustrates an example of displaying images/notes with content.

FIG. 6 illustrates an example grid that may include notes associated with content. The grid may be displayed with on near the content within a user's media dock and/or in an arena. For example, the grid may form part of a webpage that displays the content. For example, 602 may correspond to a head and may include a name designated for the content (e.g., specified by the user that added the content). 604 may represent a GreenLight button. The user may GreenLight the content by selecting the GreenLight button 604. 606 may be a GreenLights counter. GreenLights counter 606 may represent the number of times the content has been GreenLit and/or the number of unique users that have GreenLit the content. 608 may represent the (e.g., nine) cells where notes can be displayed. 610 may represent an information button that can be used to gain additional information about the content. 612 may represent a button that is used to add a note to the content. 614 may represent a notes counter that indicates the number of notes that have been added for the content.

An overlay view of the profile page enables 7G users to view the 7G Accolades that 7G users' respective content has been awarded, for example, in recognition of various metric-based achievements.

7G Arena participants (artists and fans, generally speaking) may earn 7G Accolades (which may feature Bonus Points as well as 7G Arena-access privileges designed to acknowledge and reward various forms of participation, activity, and achievements throughout the platform. The 7G Accolade Framework is designed to acknowledge 7G users for their various forms of activity and participation as measured by several unique metrics, such as GreenLights, Blasts, Lucky 7s, and Notes, for example, in addition to more conventional metrics, such as "Total Stars" and "Average Star Rating." Independent Artists, Producers, Publishers, and Original Content-Creators—as well as the most active fans and enthusiasts participating throughout Arenas, Forums, Profiles and web platform, in general—may filter and sort users from Overlays based on specific Accolades that they have earned. This is a unique, potentially more efficient, method to enable people (users) to better discover, share, rate, interact with and otherwise enjoy and support the music, videos, artwork and other digital content posted to Arenas.

The system may implement methods of compiling, factoring, aggregating, filtering, sorting, and analyzing content, data, metrics, and 7G user activity, in general, for the purpose of recognizing active, compelling, dedicated 7G users and, in some cases, rewarding them with additional 7G Arena-access through unique 7G Keys and 7G Shades that certain 7G Accolades feature as bonuses for the 7G users who earn them. This may be referred to as the overlay page(s). Specifically, the first dash/view displayed adjacent to the (zoomed-in) view of the 7G Accolade itself (which appears when a 7G user selects or 'clicks' any 7G Accolade) features vital info associated with each unique 7G Accolade; for example: when that 7G Accolade was created/designed/introduced, the (bonus) 7G Point Value for that specific 7G Accolade, what 'level' that specific 7G Accolade is (e.g. Level 1-7), and which 7G users have been awarded that specific 7G Accolade (discovery).

The 2nd dash/view of the Overlay page provides an explanation of what this Accolade represents or meant to recognize as the case may be. There may be accolades for all types of activity on the site—some potentially more 'fan' or 'enthusiast-oriented', such as accolades for voting, forum activity (comments/threads), notes (posted), and proposals—in addition, of course, to the accolades awarded for actual Arena submissions, which will be displayed in users' "First Record Room."

The 3rd dash/view of the overlay page may display the profile thumbnail for whatever 7G user created the accolade (if relevant) in addition to what he/she/they were trying to express/capture/etc. with whatever they designed/created for the accolade (which, remember, can be entire Signature Arenas of their own targeted to graphic designers, for example, among other types of artists who can design most, if not all, of the accolades for all different types of activity on 7G, as referenced above (specifically, the Accolades for various types of metrics being tracked within the Arenas, and then, throughout the site, such as GreenLights (while submission Live in Live Arena) Stars (awarded within Arena potentially daily every day the Arena's Live, as opposed to the typical non-Arena content likely featured on most users' media docks), Avg Star Rating (in Arena or somehow for ratings locked through user media docks, as explained above . . . ), L7s (""), and then, GreenLights, Notes, GreenLit Blasts, #references in other 7G users' Blasts, Total Points, et cetera).

7G Arena participants may be rewarded and otherwise acknowledged for their respective achievements as measured by various metrics (e.g. Total Votes, Total Stars, Avg Star Rating, GreenLights, Notes, Blasts, etc.) with different types of 7G Accolades (i.e. badges, icons), some of which will grant access to additional exclusive and/or otherwise restricted 7G Arenas, for example, through "bonus" 7G Shades (to grant access to fans and enthusiasts streaming, rating, etc. content posted to 7G Arenas) and 7G Keys (to grant access to Independent Artists and Original Content-Creators posting their respective content to 7G Arenas) that will accompany certain 7G Accolades.

Furthermore, certain 7G Arena Accolades and achievements may feature additional bonuses, for example: (1) ticket distribution assistance—provided, arranged or otherwise made available by 7G—to concerts, art exhibits, and independently-produced film premieres, for example, and/or (2) access to a suite of services (e.g. consulting, recording, mixing, mastering, etc.)—curated, arranged or otherwise made available by 7G—for the direct benefit of the Independent Artists, Producers, and Content-Creators able to earn the relevant 7G Accolades, and/or (3) tangible prizes and awards (e.g. music equipment, marketing campaigns, record release parties, etc.).

7G users may cast votes on content posted to 7G users' respective media Docks and to 7G Arenas (in addition to their ability to GreenLight and/or L7 content, 7G users, 7G Notes, 7G Blasts, etc.). Enough votes may result in getting more Shades by fans and enough votes/Stars/Avg/Green-Lights/Notes for an artist may get more Keys.

The "7G Voting System" also enables 7G users to cast votes from other 7G users' respective profiles if they have the requisite GreenLight Access to view the other users' respective Voting Activity from their profiles. For example, a 7G profile-viewer with the requisite GreenLight Access may view another 7G user's Voting Activity from that user's 7G profile. Furthermore, the profile-viewers may also cast votes on the same content 7G accountholders vote on from their respective 7G user profiles (as opposed to the 7G Arena where the content was posted).

The system may be configured to display messages posted by other 7G users to the Accountholder's Message Board. 7G users' respective abilities to post a message to a 7G accountholder's profile will depend on their respective "GreenLight-based relationship" and/or "Lucky 7-based relationship" with the 7G accountholder. 7G accountholders may determine whether other 7G users: (a) Are unable to post messages to their respective Message Boards at all; (b) Are able to post messages to their Message Boards subject to the respective 7G accountholders' approval or publishing thereof; or (c) Are able to post messages to their respective Message Boards freely and immediately without requiring the respective 7G accountholders' respective approval. Each of the determinations may be tailored for specific populations and/or for Lucky 7s (L7). Messages can be sorted by the Time that they were posted or published, and the "Member" hybrid heading (alphabetical or by GreenLight or L7), among other methods.

The "7G Blast" system can be configured to utilize somewhat similar methods to those employed by the "7G Message" system to organize, filter, and sort messages posted to 7G accountholders' profiles by other 7G users, but, instead, the "7G Blast" system, in this instance, organizes, filters, and sorts 7G Blasts posted by 7G users belonging to one of the hypothetical 7G accountholder's respective GreenLight Pops A-D and/or L7s. The 7G accountholder (or profile-viewer, depending on their respective GreenLight status with the accountholder) will have the ability to filter results based on GreenLight Pop and Lucky 7-related criteria, in addition to keyword and #hash.

Content within Arenas may be sorted according to one or more metrics (e.g., Total Points, L7s, and GreenLights per blast). In an example, multiple types of blasts may be used. For example, there may be content specific blasts and system-wide blasts. 7G users may have the ability to post and update Blasts related to any of their Live 7G Arena Content (or their respective Dock Content depending on their membership type, for example) independently from their 7G account-based Blasts, which can be featured below their 7G profile images on their respective 7G user profiles.

The blast framework may be comprised of GreenLight Population-based and Lucky7 Population-based multicast communication systems. The 7G Blast Framework utilizes methods to enable 7G users to communicate information to, and receive information from, their respective curated GreenLight Pop-based and Lucky 7-based networks in various instances, locations, contexts, et cetera throughout the 7G web-based Arena-hosting, content-aggregating ecosystem. Blasts may be associated with 7G users, 7G user content, or 7G user Notes. 7G users have the option to delete their older Blasts and/or archive them and/or enable search- and view-ability for their respective GreenLight Pops and specific Lucky 7s of their choosing.

7G users may adjust view-ability and/or actual content of their different types of Blasts (e.g. user Blasts, content Blasts, Note Blasts) for each of their respective GreenLight Pops A-D and/or their Lucky 7s. For example, if a Pop D user arrives at a hypothetical 7G accountholder's profile, he may only be able to view an abbreviated or somehow condensed Blast (e.g. more vague in some regard), for example, as opposed to what one of the accountholder's respective Pop As or L7s may view depending on the accountholder's GreenLight and/or Lucky 7-based settings.

The GreenLight Stream may be used to customize 7G users' respective streaming of content, as well as 7G user and 7G user content recommendations, etc. One or more of the following factors may be used to determine which content appears in a first user's GreenLight Stream. a) Content from the first user's GreenLight Pops A, B, C, or D (e.g., possibly excluding D), b) Content the first user's Lucky 7s, c) Content from the Pop As of users that as are within the first user's Pop A d) Content from user s that have similarities in interests to the first users (e.g. similar ratings of the same content in the same 7G Arenas, Lucky 7s in common, GreenLight Pop A's in common, GreenLit Blasts in common, GreenLit Notes in common, etc.), e) Content that the first user has explicitly added to the stream and/or has GreenLit (e.g. GreenLit 7G Arenas, GreenLit 7G users, GreenLit 7G Forums, GreenLit content, GreenLit Blasts, and GreenLit Notes GreenLit, 5 star ratings of content posted to 7G Docks and/or 7G Arenas, and/or the like in various combinations. A 7G user's respective GreenLight Stream may also recommended 7G Arenas and/or automatically stream content from 7G Arenas when a user logs in or otherwise "opens the 7G app" depending on the user's respective "GreenLight Stream" account preferences.

In an example, the GreenLight Stream may be specific to an arena. For example, a Greenlight stream for a specific arena may include content that the user has GreenLit from the arena but not the additional content from the arena. In example, the GreenLight Stream for a specific arena may be filter by population. For example, a user may select to see a GreenLight Stream for their Pop A, and such a stream may comprise each of the content in the arena that has been GreenLit by the user's Pop A. Similarly, a user may select to see a GreenLight Stream for their Pop B or C, and such a stream may comprise each of the content in the arena that has been GreenLit by the user's Pop B or C, respectively. The content of a GreenLight stream may then be streamed (e.g., played or executed) by the user according to their desired filter options.

Figure 7:
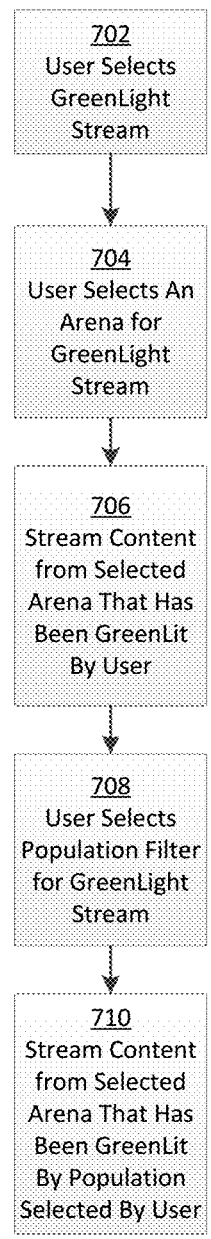
FIG. 7 illustrates an example flow for generating a stream (e.g., a GreenLight stream) for a user based on indicated preferences and/or relationships.

FIG. 7 illustrates an example flow for generating a GreenLight Stream for a given user. The GreenLight stream can be considered a module that provides a customized content stream (e.g., music player) that plays certain content based on GreenLights (e.g., indicated interest) by the user that has selected the GreenLight Stream as well as based on GreenLights (e.g., indicated interest) of users within different GreenLight Populations (e.g., Pops A, B, and/or C in this example) of the user selecting the GreenLight stream.

For example, at 702 a given user may select their GreenLight Stream from their profile page or some other page on the site. At 704, the user may select an Arena for their GreenLight stream. The system may prompt the user to select an arena when the GreenLight stream is selected. In an example, multiple arenas may be allowed to be selected. At 706, the user may begin streaming content from the selected arena, and the content being streamed may correspond to content within the selected arena that has been GreenLit by the user who selected the GreenLight Stream. Other content in the arena that has not been GreenLit by the user that selected the GreenLight stream may not for part of the content stream.

At 708, the user may select a population filter for the GreenLight stream. For example, the population filter may allow the user to select one or more of Populations A, B, or C (Population D—no GreenLights exchanged—may be excluded in this example). Upon selecting a population filter, at 710 the stream may be altered such that content from the selected arena that has been GreenLit by users in the selected Population may be streamed, while content in the arena that has not been GreenLit by a user in the selected Population may be excluded from the stream. For example, if the user had selected a San Francisco Rock Spring 2016 arena and a population filter of Population A, the GreenLight stream would then include any content in the San Francisco Rock Spring 2016 arena that had been previously GreenLit by another user that is in the streaming user's Population A.

Figure 8:
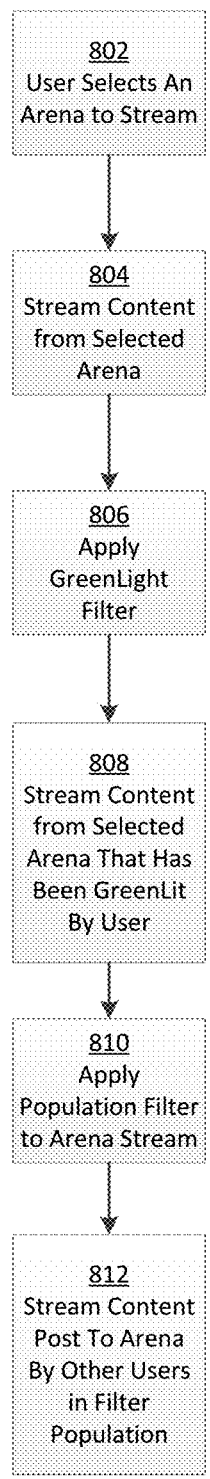
FIG. 8 illustrates an example of streaming content from an arena.

FIG. 8 illustrates an example flow for streaming content from within an arena by a given user. The such an "Arena Stream" can be considered a module that provides a customized content stream (e.g., music player) that plays certain content within the arena that was generated or added by other users that have been GreenLit (e.g., indicated interest) by the user that has selected the arena stream. The arena stream may be filterable based on different GreenLight Populations (e.g., Pops A, B, and/or C in this example) such that content added by different populations can be filtered accordingly.

For example, at 802 a given user may select an arena to stream from their profile page or some other page on the site. At 804, the user may begin streaming content that has been added to the arena. Prior to selecting a population filter, the stream may include all content within the arena or a subset of content within the arena. At 806, the user may filter the arena stream based on GreenLights. If the user filters based on GreenLights, then the user may begin streaming content from the selected arena that has been GreenLit by the user who selected the arena stream. Other content in the arena that has not been GreenLit by the user that selected the GreenLight stream may not for part of the content stream after application of the filter at 806. At 808, the user may begin streaming content form the selected arena that the user had previously greenlit.

At 810, the user may select different filter for the arena stream, for example a population filter for the arena stream. For example, the population filter may allow the user to select one or more of Populations A, B, or C (Population D—no GreenLights exchanged—may be excluded in this example). Upon selecting a population filter, at 812 the stream may be altered such that content from the selected arena that has been added or generated by a user that is within the filter Population may be streamed, while content in the arena that was added or generated by a user that is outside the selected Population may be excluded from the stream. For example, if the user had selected a San Francisco Rock Spring 2016 arena and a population filter of Population A, the GreenLight stream would then include any content in the San Francisco Rock Spring 2016 arena that had been added to the arena by a user that is in the streaming user's Population A.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer, mobile device, or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement any host computer. For example, the user's profile in this scenario may not display one or more of the Information/Purchase page of the user (and/or less than all of the Information/Purchase page of the user), the 7G Community page of the user (and/or less than all content contained and archived on the 7G Community page of the user), the other networks page of the user (and/or less than all of the other networks page of the user), the Comments & Votes page of the user (and/or less than all of the Comments & Votes page of the user), the Record Room page of the user (and/or less than all of the Record Room page of the user), and/or other profile details of the user (e.g., contact information, background information, media dock content, 7G Arenas that particular 7G Member has submitted content to, content provided, content viewed, points earned in the GreenLight system, content rated, activity history, GreenLight preferences, GreenLight sections, rankings, ratings, etc.).

What is claimed:

1. A method for distributing content implemented by one or more servers, the method comprising:
   receiving a first request, the first request corresponding to a request to add first content to a media dock associated with a first user;
   determining whether to allow the first content to be added to the media dock associated with the first user based on one or more characteristics of the first content;
   associating the first media with the media dock associated with a first user on condition it was determined to allow the first content to be added to the media dock associated with the first user based on the one or more characteristics of the first content;

receiving a second request, the second request corresponding to a request to add the first content from media dock associated with a first user to a first arena, the arena corresponding to an aggregation of content that are associated with a common time, common location, and common genre;

adding the first content from the media dock associated with the first user to the first arena; and sending a first webpage to at least one device associated with another user, the first webpage comprising a visual representation of the first arena, wherein content, including the first content, that has been added to the arena is displayed on the visual representation of the first arena.

2. The method as in claim 1, further comprising:
receiving a request to sort or filter the content that has been added to the first arena from the second user, the request to sort or filter indicating that the content is to be sorted or filtered based on a first criteria, the first criteria corresponding sorting or filtering according to at least one user population of a plurality of user populations defined with respect to the second user.

3. The method as in claim 2, wherein the plurality of user populations defined with respect to the second user comprise four user populations defined with respect to the second user, the four user populations defined with respect to the second user corresponding to:

a first population, the first population corresponding to users that have both indicated interest in the second user and have had the second user indicate interest in them;

a second population, the second population corresponding to users that have indicated interest in the second user and but have not had the second user indicate interest in them;

a third population, the third population corresponding to users that have not indicated interest in the second user but have had the second user indicate interest in them; and a fourth population, the fourth population corresponding to users that have neither indicated interest in the second user nor have had the second user indicate interest in them.

4. The method as in claim 3, wherein the request to sort or filter indicated a secondary criteria for sorting the content of the first arena that share a common first criteria.

5. The method as in claim 3, further comprising:
receiving a first blast message from the first user; and
associating the first blast message with the first content in the first arena based on receiving the first blast message from the first user.

6. The method as in claim 5, wherein the first blast message is automatically displayed on a profile page of the first user based on receiving the first blast message from the first user.

7. The method as in claim 5, wherein the first blast message is automatically displayed with the first content in the visual representation of the first arena based on receiving the first blast message from the first user.

8. The method as in claim 7, further comprising:
receiving a second blast message from the first user;
associating the second blast message with the first content in the first arena based on receiving the second blast message from the first user; and replacing the first blast message with the second blast message in the visual representation of the first arena based on receiving on receiving the second blast message from the first user.

9. The method as in claim 1, further comprising:
receiving a request from the another user to stream the first content included in the first arena; and
sending the first content to the another user.

10. A method for associating images with content implemented by one or more servers, the method comprising:
receiving a first request, the first request corresponding to a request to add first content to a media dock associated with a first user;

determining whether to allow the first content to be added to the media dock associated with the first user based on one or more characteristics of the first content;

associating the first media with the media dock associated with a first user on condition it was determined to allow the first content to be added to the media dock associated with the first user based on the one or more characteristics of the first content;

receiving a second request, the second request corresponding to a request to add the first content from media dock associated with a first user to a first arena, the arena corresponding to an aggregation of content that are associated with a common time, common location, and common genre;

adding the first content from the media dock associated with the first user to the first arena; and receiving a request from a second user to associate an image with the first content in the first arena;

determining whether the second user is permitted to associate the image with the first content;

adding the image to a grid associated with the first content on condition that it is determined that the second user is permitted to associate the image with the first content, wherein the grid comprises a plurality of image positions and the image is added to one of the plurality of image positions; and sending a first webpage to at least one device associated with another user, the page comprising a visual representation of the first arena, wherein content, including the first content, that has been added to the arena is displayed on the visual representation of the first arena, the image is displayed in the grid, and the grid is displayed with the first content.

11. The method as in claim 10, further comprising:
receiving a request from the first user to move the image to a different position in the grid;
sending an updated first webpage to at least one device associated with another user, the updated first webpage comprising the visual representation of the first arena, wherein the content, including the first content, that has been added to the arena is displayed on the visual representation of the first arena, the image is displayed in the updated position in the grid, and the grid is displayed with the first content.

12. The method as in claim 11, wherein the plurality of image positions in the grid corresponds to nine image positions.

13. The method as in claim 10, wherein determining whether the second user is permitted to associate the image with the first content is based on which of a plurality of user populations the second user belongs to with respect to the first user, wherein:

the second user is defined to be in a first population on condition that the first user has indicated an interest in the second user and the second user has indicated an interest in the first user;

the second user is defined to be in a second population on condition that the first user has not indicated an interest in the second user and the second user has indicated an interest in the first user;

the second user is defined to be in a third population on condition that the first user has indicated an interest in the second user and the second user has not indicated an interest in the first user; and the second user is defined to be in a fourth population on condition that the first user has not indicated an interest in the second user and the second user has not indicated an interest in the first user.

14. The method as in claim 10, wherein the first content is received from a third party platform separately from the request to add the content to the media dock received from the first user.

15. A method of aggregating content of interest to a user implement by one or more servers, the method comprising:
receiving a request for a content stream from a first user, wherein the request for the content stream indicates that the user is requesting content associated with one of a plurality of user populations, wherein the plurality of user populations comprise:
a first population, the first population corresponding to users that have both indicated interest in the first user and have had the first user indicate interest in them,
a second population, the second population corresponding to users that have indicated interest in the first user and but have not had the first user indicate interest in them,
a third population, the third population corresponding to users that have not indicated interest in the first user but have had the first user indicate interest in them, and
a fourth population, the fourth population corresponding to users that have neither indicated interest in the first user nor have had the first user indicate interest in them;
sending a webpage aggregating a plurality of content to the first user, wherein the plurality of content corresponds to content generated by one of the first population, the second population, the third population, or the fourth population depending on which one of the plurality of user populations was indicated in the request for the content stream.

16. The method of claim 15, wherein the first request further indicates that the first request is associated with a specific arena, the specific arena having content associated with a common time, common location, and common genre, and the plurality of content aggregated in the webpage corresponds to content generated by one of the first population, the second population, the third population, or the fourth population that has been added to the specific arena.

* * * * *